United States Patent Office 3,573,911

Patented Apr. 6, 1971

3,573,911

LIGHT-SENSITIVE COMPOSITION CONTAINING ARYL-THIOKETONES AS COLOR FORMERS

Richard A. Fotland, Lyndhurst, Ohio, assignor to Horizons Incorporated, a Division of Horizons Research Incorporated No Drawing. Filed Feb. 2, 1967, Ser. No. 613,404
Int. Cl. G03c *3/24*
U.S. Cl. 96—48 12 Claims

ABSTRACT OF THE DISCLOSURE

The photosensitive composition of this invention comprises an organic halogen compound and a color former which is an aryl-thioketone, both of which are dispersed in or supported on a binder or carrier material. The composition exhibits orthochromatic sensitivity in the visible portion of the spectrum and when it is used in the form of a film, the film is capable of being optically developed by exposure to near infrared radiation.

This invention relates to non-silver photosensitive compositions which print-out an image directly upon exposure to a suitable dosage of visible light or which print-out an image after exposure to a suitable dosage of visible light as a result of a subsequent exposure to near infrared radiation and to the use of such films in photographic process. More particularly, this invention relates to photosensitive compositions comprising at least one color former selected from the group consisting of aryl-thioketones, as hereinafter defined, intimately admixed with one or more activators or sensitizers and supported in or on a binder or carrier. The films of the present invention exhibit orthochromatic spectral sensitivity, i.e. sensitivity throughout the violet, blue, green and yellow portion of the visible spectrum.

The constituents comprising the visible light-sensitive compositions of the present invention include the following:

(A) One or more aryl-thioketones;

(B) At least one organic compound containing a photo-excitable halogen atom;

(C) A binder, support or carrier on which or in which the above noted constituents are dispersed or supported; and (D) One or more dye bases, leuco compounds or other color progenitors.

Other ingredients may be added to the compositions for specific purposes providing they do not adversely affect the photosensitive reaction between the thioketone and constituent B in the composition. Small quantities of amines or other organic bases may be added to the composition for the purpose of neutralizing trace amounts of acid impurities. A plasticizer added to the carrier would constitute an additional type of additive.

(A) The aryl-thioketones

The compounds which form the colored image when activated by the products produced upon exposing the photosensitive material to a suitable dose of visible light are designated aryl-thioketones. These compounds may be represented by one or another of two general formulas, namely, R,R′C=S and

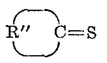

wherein R and R′ each represent aryl groups which may be substituted or unsubstituted, carbocyclic and/or heterocyclic, single ring or multiple rings which may contain fused rings or unfused rings and

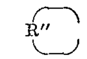

represents the atoms necessary to complete a six membered heterocyclic ring containing the >C=S group, which ring may be part of a fused ring system, such as a chromone, thiochromone, acridone or the like, or a single ring, such as a pyrone or pyridone, and in which said rings may be substituted to any desired extent.

Compounds intended to be included within these two formulas include the following compounds which are given by way of example and which are not to be construed as limiting the above general formulas:

R,R′C=S

Thiobenzophenone ($C_6H_5C(=S)—C_6H_5$)

4-4′ Diamino-thiobenzophenone ($H_2NC_6H_4—C(=S)—C_6H_4NH_2$)

4,4′ Dimethyl-diamino 3,3′ dimethyl thiobenzophenone

N′′,N′′′ Tetramethyl-di-γ′-amino-di-β pyridyl-thio-ketone

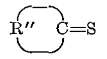

4-thio-γ-pyrone

N-γ-pyridyl-4-thiopyridone 2,3 dimethyl-thiochromone 1,4-dithiochromone

Thioacridone

N-phenylthioacridone 4-thionflavone

(B) The activator or sensitizer

The second essential constituent in the composition of the present invention is an organic halogen compound in which at least three halogen atoms, other than fluorine, are attached to a terminal carbon carbon atom in an aliphatic or aromatic compound which may be generally represented by the formula A—C—$X_3$, wherein each X represents a halogen atom which may be chlorine, bromine or iodine and all of which need not be the same in a single compound and A represents a monovalent entity selected from the group consisting of H, Cl, Br, I, alkyl (methyl, ethyl), substituted alkyl (particularly halogen-substituted alkyl), aryl and substituted aryl, and aroyl. Preferred activator or sensitizer compounds include: $CBr_4$, $CHI_3$, $CHBr_3$, γγγ-tribromoacetophenone and p-nitrobenzotribromide.

(C) The binder

The binder, support or carrier on which or in which a mixture of the above essential constituents and any other specially added materials are dispersed or supported may be a plastic, synthetic resin, paper, or other suitable material. For purposes of applying the aryl-thioketones and the activator to the support, they are preferably placed in solution in a solvent or mixture of solvents. The resulting solution may then be applied to the support as a thin film or, in the case of paper, by immersing the support in the solution and thereby impregnating the paper with the mixture, or by any other suitable technique, adapted to use with any specific support.

It is also possible to dissolve a binder in the solution containing the mixture of active ingredients and to then cast a thin film of the resulting solution onto glass, plastic or any other suitable substrate to which it may become permanently affixed or from which it may be stripped after the solvents have evaporated and a self-sustaining film has been formed. A preferred binder is polystyrene, but other synthetic film-forming polymers, cellulose derivatives and the like, such as disclosed in Wainer U.S. Pat. 3,042,515, may be employed.

(D) The color progenitors

The addition of dyes and dye bases to the composition for purposes of producing any desired hue in the visible image is contemplated in the present invention. For convenience in this specification these materials will be referred to as color progenitors. Suitable materials include styryl dye bases, cyanine dye bases, merocyanine dye bases, leuco triphenylmethane dyes, leuco xanthenes and leuco bases of such organic dyes as leuco paraosaniline. In addition, the monomer N-vinylcarbazole appears to act as a color progenitor. The amount of color progenitor added to the formulation is not critical and depends upon the final sensitometric properties desired. Amounts of color progenitor ranging from 0.1 to 10 times the weight of the aryl-thioketone have been employed.

By the use of these materials the final image color, maximum optical density, and shape of the sensitometric curve in films containing aryl-thioketones and a halogen activator may be modified to produce a desired result.

The preferred process employing films formulated with aryl-thioketones involves preparing a solution of the selected compounds and applying said solution to the desired support or base in a wet thickness in the range of 1 to 6 mils. After drying in air, the sensitized media is photographically exposed to visible radiation. The latent or invisible image which is thereby produced, is developed using a blanket exposure of radiation, generally in the red or near infrared portions of the spectrum, whose spectral distribution falls outside of the spectral absorption range of the unexposed film but lies within the optical absorption range of the image compound formed upon exposure. After optical development, the film may be fixed, so as to be insensitive to subsequent exposure to radiation, by rinsing in a solvent which swells the binder and dissolves the unreacted aryl-thioketone and activator.

EXAMPLE 1

A coating mixture was prepared as follows: 50 mg. 4,4′-bis-dimethylamino-thiobenzophenone and 150 mg. iodoform were dissolved in 4 ccs. of a 10% solution of polystyrene in benzene. Forty milligrams of p-cresol and 4 mg. of triethylamine were added to this mixture in order to neutralize trace quantities of acid and inhibit or minimize any dark reaction. A coating was prepared by pouring this mixture onto a 5 mil Mylar film base and employing a 1½ mil wet film thickness Bird applicator to draw-down a uniform film. After drying, the film was exposed in an Eastman Kodak 101 process sensitometer. The film was then optically developed using a narrow band infrared radiation source consisting of a 1 kilowatt tungsten-iodine lamp; the output of which was filtered using a Corning CS No. 7–69 (Glass No. 2600) infrared transmitting filter. This filter has a bandpass of 740 to 1000 millimicrons. The image was developed for approximately 5 minutes, at which time background fog is observable. The American Standard speed was measured and found to be 0.005. The film was fixed employing a solvent rinse consisting of 1 part acetone to 4 parts petroleum ether in order to remove the activator and unreacted thioketone from the film.

EXAMPLE 2

The same procedures were followed as in Example 1. The formulation consisted of 60 mg. of the dimethylamino-thiobenzophenone and 180 mg. of iodoform dissolved in 4 ccs. of 10% solution of polystyrene in benzene. In this case, an American Standard speed of 0.004 was obtained.

EXAMPLE 3

A formulation was prepared similar to previous examples; the formulation consisting of 40 mg. of dimethyl-aminothiobenzophenone, 1200 mg. of carbon tetrabromide and 100 mg. of Leuco Crystal Violet. During the development procedure, a Wratten No. 87 filter was placed over the Corning glass filter in order to eliminate radiation having wavelengths shorter than 780 millimicrons from reaching the film. After optical development and solvent fixing, the American Standard speed was measured and found to be 0.08.

EXAMPLE 4

A formulation was prepared consisting of 2 cc. 10% Borden 230,000 molecular wt. polystyrene in benzene
2 cc. 10% Borden 230,000 molecular wt. polystyrene in chloroform
300 mg. N-vinylcarbazole
1200 mg. carbon tetrabromide
50 mg. Leuco Crystal Violet
50 mg. 4,4′-dimethylaminothiobenzophenone
10 mg. 4-p-dimethylamino styryl quinoline The composition was photographically exposed as in the previous examples and was developed with a Corning No. 2600 filter, as in Example 1. After optical development and solvent fixing, the American Standard speed was measured and found to be 0.15.

The relative proportions of the several constituents in the photosensitive film can be varied within reasonably broad limits, e.g. for each part by weight of aryl-thioketone, between 1 and 50 parts by weight of organic halogen compound may be used without adversely affecting the photosensitivity of the composition.

Optimum exposure of the composition when in the form of thin films between 1 and 5 mils in thickness is an amount approximately $10^{-5}$ watt-seconds per square centimeter for the photographic exposure step and an exposure to approximately one watt second per square centimeter of near infrared radiation at the optical development step.

Having now described the present invention, it is not intended that it be limited except as may be required by the appended claims.

I claim:

1. A photosensitive composition which prints out a visible image directly as a result of exposure to a pattern of radiation in the visible or as a result of a subsequent exposure to radiation in the near infrared, said composition consisting essentially of:

(a) at least one thioketone selected from the group consisting of aryl thioketones represented by the general formula $$R-\underset{\underset{S}{\|}}{C}-R'$$

wherein each of R and R′ represents an aryl group;

(b) at least one organic compound containing a photoexcitable halogen atom, said constituents being supported by a binder and said thioketone being one which forms a colored product when it reacts with the products resulting from said exposure of said organic halogen compound to said pattern of radiation.

2. The composition of claim 1 including in addition at least one color progenitor selected from the group consisting of styryl, cyanine, merocyanine, leuco triphenylmethane, leuco xanthene, and leuco pararosaniline dyes and dye bases.

3. The composition of claim 1 wherein the organic compound containing a photoexcitable halogen atom is selected from the group of compounds represented by the general formula $A—C—X_3$ wherein each X represents a halogen atom selected from the group consisting of Cl, Br and I and A is a monovalent entity selected from the group consisting of H, Cl, Br, I, alkyl, substituted alkyl, aryl, substituted aryl, and aroyl.

4. A photographic film comprising the composition of claim 1 as a thin film.

5. The composition of claim 1 wherein constituents (a) and (b) are dispersed in a film-forming binder.

6. The composition of claim 1 wherein (a) is a thiobenzophenone.

7. The composition of claim 1 wherein (b) is halogen substituted alkane.

8. The composition of claim 1 wherein there are between 1 and 50 parts by weight of (b) for every part by weight of (a).

9. A process which comprises preparing a solution of the composition of claim 1; applying said solution to a support, and after the solvent has been dissipated from the resulting product, photographically exposing said product to a pattern of visible radiation and thereafter fixing the visible image resulting from said photographic exposure.

10. The process of claim 9 wherein the exposure is to a dose of approximately $10^{-5}$ watt seconds per square centimeter.

11. The process of claim 9 wherein after the initial exposure and prior to fixing, the product is exposed to blanket radiation in the near infrared in order to develop a visible image.

12. The process of claim 9 wherein the composition comprises a thiobenzophenone and a halogenated alkaline.

References Cited

UNITED STATES PATENTS

| | | | |
|---|---|---|---|
| 3,042,517 | 7/1962 | Wainer | 96—48 |
| 3,072,485 | 1/1963 | Reynolds et al. | 96—115 |
| 3,147,117 | 9/1964 | Wainer, et al. | 96—90 |

FOREIGN PATENTS

| | | | |
|---|---|---|---|
| 1,094,368 | 12/1967 | Great Britain | 96—90 |
| 6516580 | 7/1966 | Netherlands | 96—90 |
| 959,034 | 5/1964 | Great Britain | 96—90 |

NORMAN G. TORCHIN, Primary Examiner

W. H. LOUIE, Jr., Assistant Examiner

U.S. Cl. X.R.

96—90